May 5, 1959   F. PERLIN   2,884,848
SWIVEL MOUNT AND AIR GUIDE DEVICE INCLUDING THE SAME
Filed Feb. 7, 1958   5 Sheets-Sheet 1
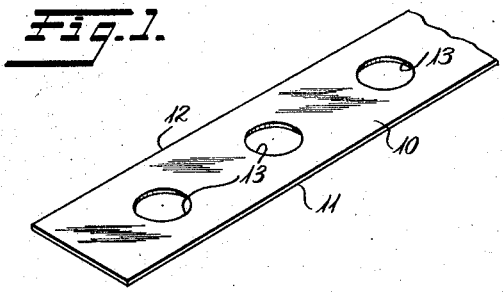
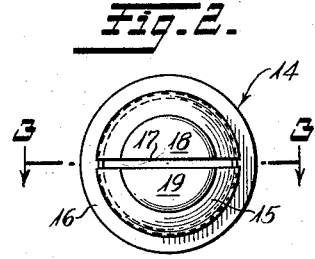
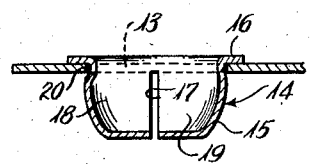
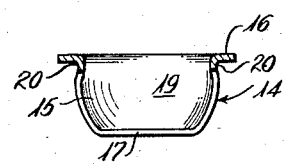
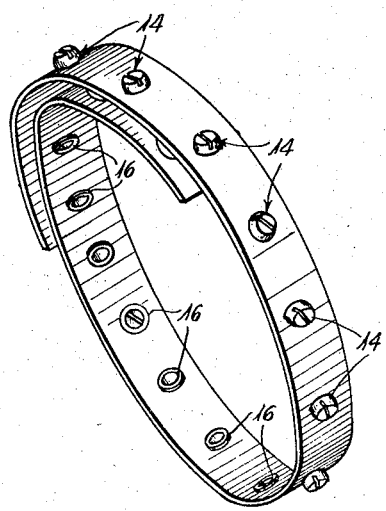
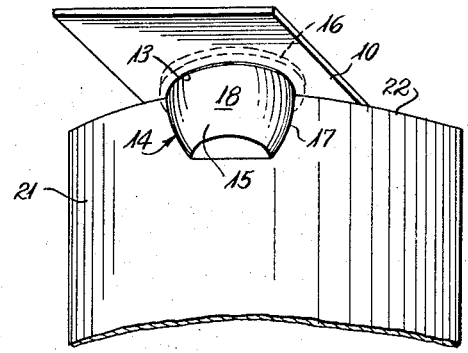
INVENTOR
*Fred Perlin*
BY
ATTORNEYS May 5, 1959 F. PERLIN 2,884,848
SWIVEL MOUNT AND AIR GUIDE DEVICE INCLUDING THE SAME
Filed Feb. 7, 1958 5 Sheets-Sheet 2
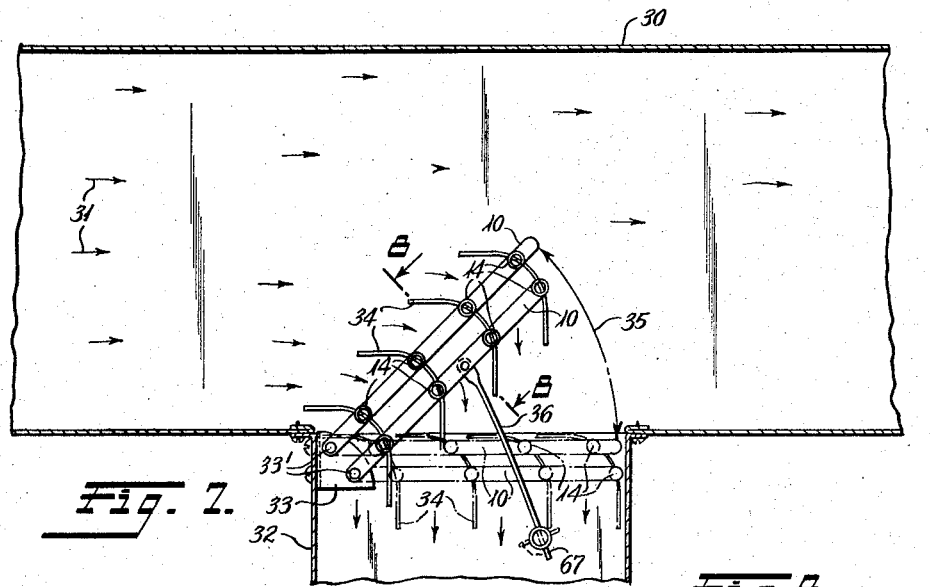
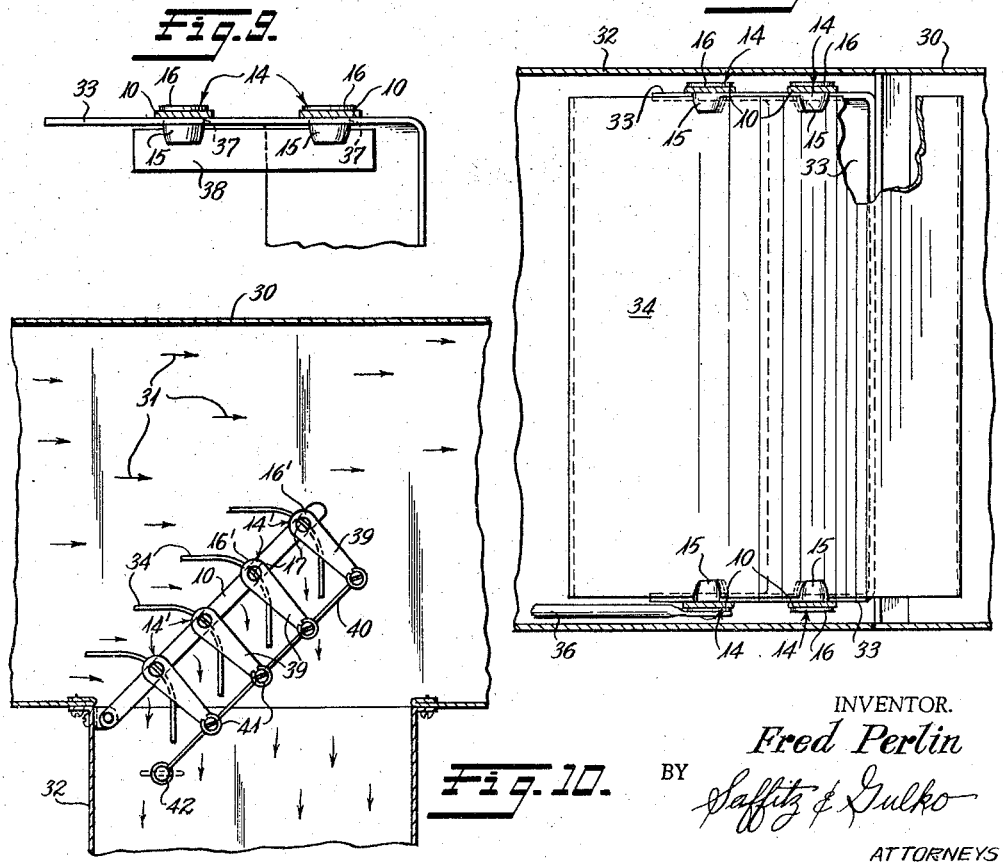
INVENTOR.
Fred Perlin
BY
ATTORNEYS May 5, 1959      F. PERLIN      2,884,848
SWIVEL MOUNT AND AIR GUIDE DEVICE INCLUDING THE SAME
Filed Feb. 7, 1958      5 Sheets-Sheet 3

INVENTOR.
Fred Perlin
BY
ATTORNEYS

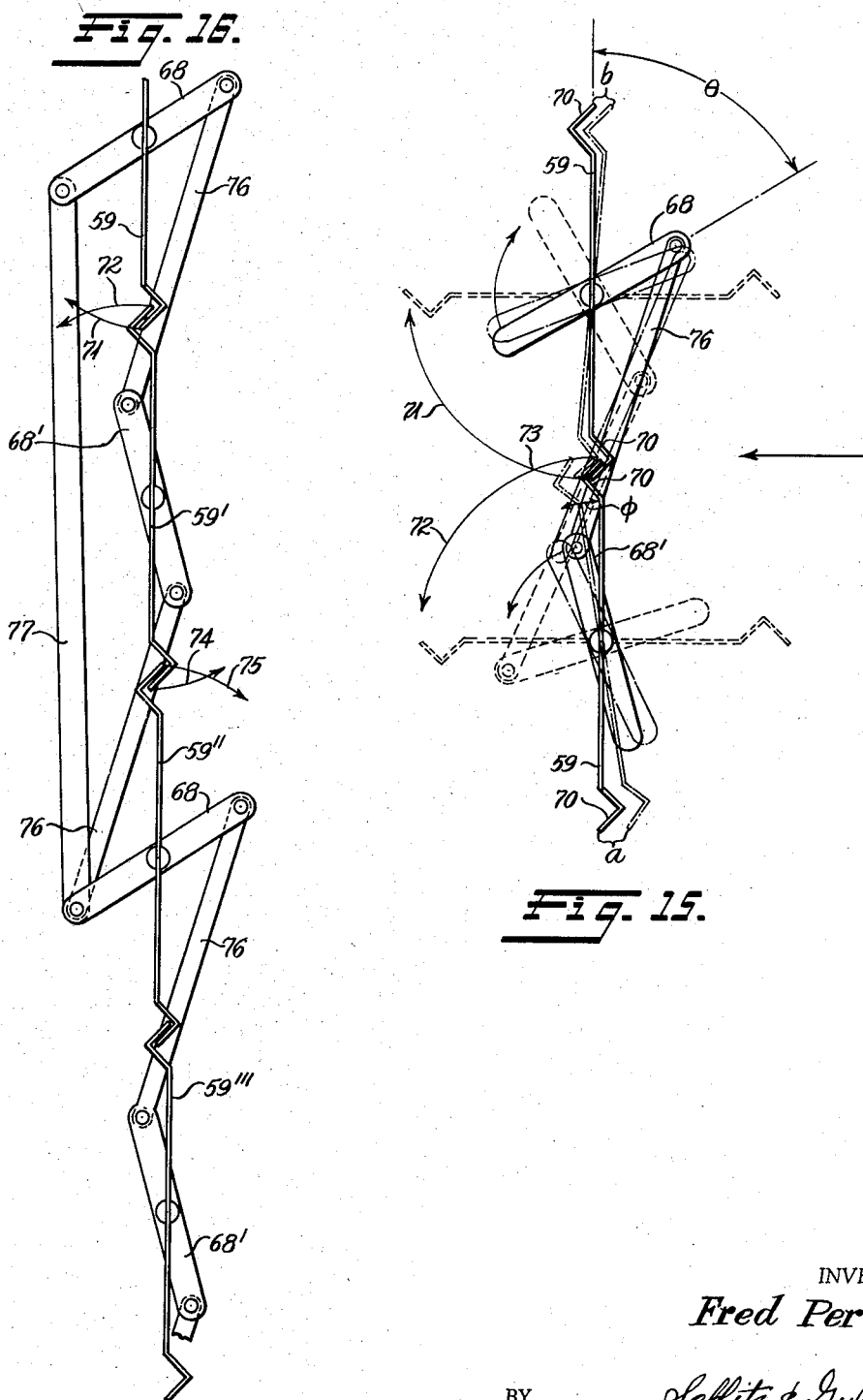

May 5, 1959  F. PERLIN  2,884,848
SWIVEL MOUNT AND AIR GUIDE DEVICE INCLUDING THE SAME
Filed Feb. 7, 1958  5 Sheets-Sheet 5
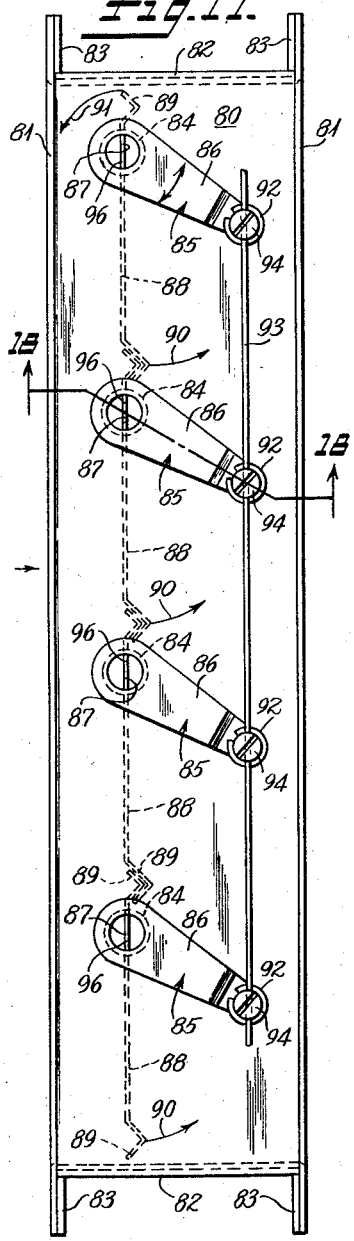
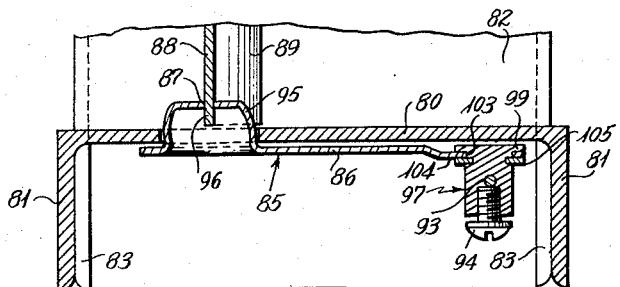
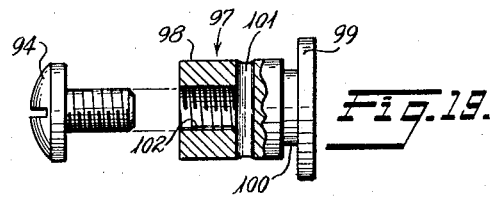
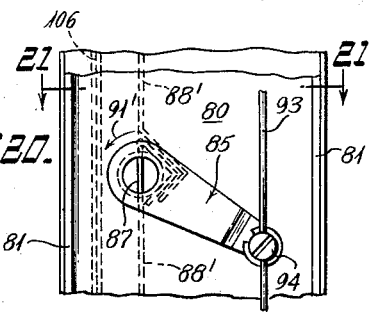
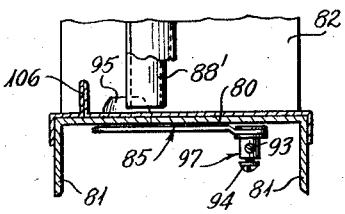
INVENTOR
Fred Perlin
BY
ATTORNEYS

United States Patent Office 2,884,848
Patented May 5, 1959

2,884,848

SWIVEL MOUNT AND AIR GUIDE DEVICE INCLUDING THE SAME

Fred Perlin, Oyster Bay, N.Y., assignor to Elgen Manufacturing Corporation, a corporation of New York Application February 7, 1958, Serial No. 713,978

4 Claims. (Cl. 98—110)

The present invention relates to air guide devices for use in heating and ventilating systems and particularly to air guide devices of simplified construction in which a plurality of air-turning blades are mounted for swivel movement with respect to the strips or side supports upon which the blades are mounted.

The invention includes the swivel mount itself and also various air guide structures such as diverters, multiblade dampers and relief dampers as well as various subcombinations thereof.

In one of its aspects, the invention relates to air guide devices in which the blades retain a predetermined position with respect to the ducts within which they are mounted so that the air flowing through these ducts can be diverted as desired by pivotal movement of the blade supports resulting in swivel movement of the blades with respect to the strip or strips which support the same. The invention also includes the combination of mounting strip and swivel securing elements which is adapted for use in diverters, as indicated above, as well as for diverse other utility.

The invention is particularly concerned with air guide devices (diverters) of the type shown in the patent to Smith 2,001,801, dated May 21, 1935 which, in addition to providing a clear illustration of the type of air guide device under consideration here, also illustrates the varied utility of these air guide devices or diverters when applied to heating and ventilating systems.

The air guide devices or diverters which are here envisioned are primarily adapted for use as a "splitter damper" to divert the flow of air in a uniform manner. Frequently, the objective is to divert a portion or all of the air flowing through a duct into a laterally projecting secondary duct. In other instances, the objective is to divert a portion of the air flowing through a duct into a register so that the heated or cooled air may flow into a room. In any event, the angular position of one of the blade supporting strips is adjusted as by pivoting one of the strips into or out of the main duct in which the air guide unit is mounted.

The invention, in another of its aspects, is concerned with dampers which may be of various types, e.g., single blade or multiblade, and the latter may have parallel or opposed blade action. "By-pass" dampers are also contemplated. The invention has, as a feature thereof, the provision of multiblade dampers of opposed blade action in which the blades overlap and are linked together at a side thereof in a manner causing the overlapping blades to open before the underlapping blade and close after the underlapping blade to prevent the adjacent blades from interfering with one another during the opening and closing operations.

The invention, in still another aspect thereof, is concerned with relief dampers in which a plurality of blades are linked together for movement in unison to provide a rattle-free relief damper of simple construction and increased operating efficiency.

The invention, in all of its various aspects, is based upon a swivel connection with the lateral margin of a blade which permits adjustment of blade position immediately prior to final securement with the blade being rectangular in shape and being securable at various positions along the lateral margin thereof.

In accordance with the present invention, a side plate or strip is formed with a generally circular opening and cup-shaped securing elements are swivel mounted within these openings. The cup-shaped securing elements comprise a cup-shaped portion having a slot extending across the meridian of the cup-shaped portion and the lateral edge of a blade is inserted within the slot to project into the interior of the cup-shaped portion of the securing element. The portion of the blade which projects through the slot is secured to the interior of the cup-shaped portion in any suitable manner, but preferably by deforming the projecting portion of metal to engage the interior of the cup-shaped portion. Preferably, the distance between the termination of the slot and a flange (which may include an integral lever) desirably formed at the rear of the securing element to limit the extent of insertion of the securing element in the opening in the side plate, is greater than the thickness of the side plate so that clearance is provided between the blade and the side plate to maintain the blade free of the side plate for rotation or swivel movement about the axis of mounting which is the longitudinal axis of the securing element.

The invention will now be more fully described in conjunction with the accompanying drawings in which:

Fig. 1 is a perspective view of an elongated narrow strip of sheet metal constructed in accordance with the invention prior to insertion of flanged, cup-shaped securing elements in the longitudinally spaced apart openings thereof;

Fig. 2 is a top plan view of a flanged, cup-shaped securing element constructed in accordance with the invention;

Fig. 3 is a cross-section of the flanged cup-shaped securing element of Fig. 2 taken on the line 3—3 of Fig. 2;

Fig. 4 is a transverse cross-section taken through the longitudinal center line of the strip of Fig. 1 after insertion of the flanged cup-shaped securing elements shown in Figs. 2 and 3 into the openings of the strip of Fig. 1;

Fig. 5 is a partial perspective view showing a curved blade mounted by means of a flanged cup-shaped securing element positioned within an opening in a strip of sheet metal for rotation about the longitudinal axis of the securing element;

Fig. 6 is a perspective view showing a coil of an elongated length of strip with securing elements mounted along the length thereof;

Fig. 7 is a top plan view of an illustrative diverter mounted in a side extension of a duct system;

Fig. 8 is a cross-section taken on the line 8—8 of Fig. 7;

Figure 12:
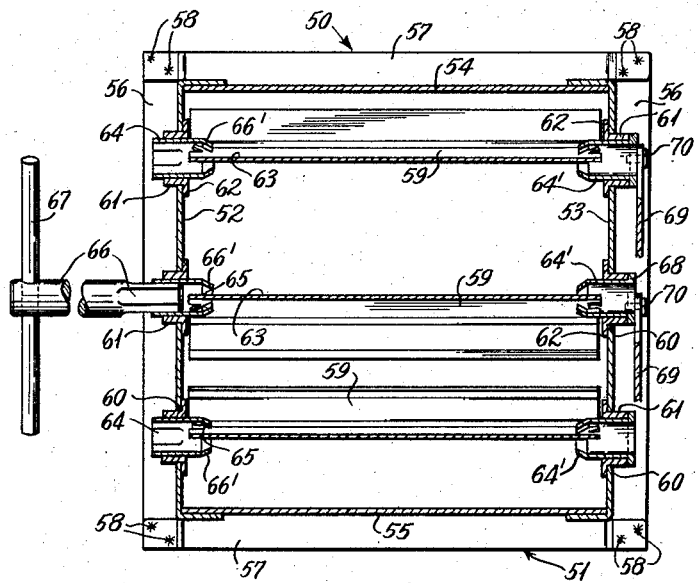
Figure 11:
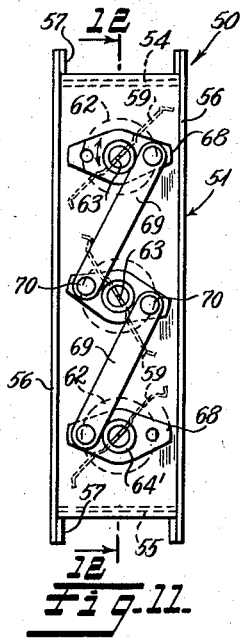
Figure 13:
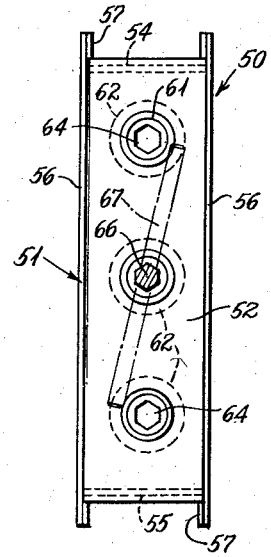
Figure 14:
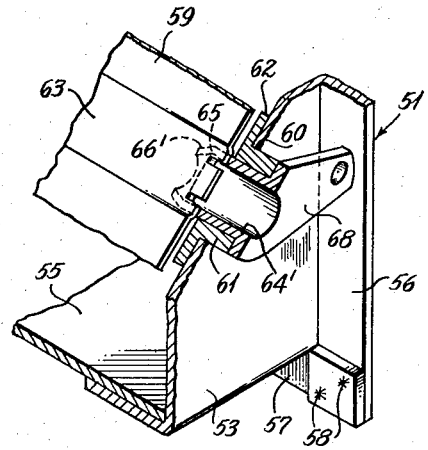

Fig. 9 is a detail view showing a manner of pivotally mounting the strips 10 to the support 33 utilizing the securing elements 14;

Fig. 10 is a top plan view, similar to Fig. 7, showing a modified form of diverter in which only a single strip is employed to rotatably mount the blades at each lateral end thereof, the securing elements including lever arms which are connected together to complete the diverter;

Fig. 11 is a side view of an illustrative damper constructed in accordance with the invention;

Fig. 12 is a cross-section taken on the line 12—12 of Fig. 11;

Fig. 13 is another side elevation of the damper shown in Fig. 11;

Fig. 14 is a partial perspective view showing the details of the swivel mounting of the damper blade in the damper frame;

Fig. 15 is a schematic view showing the interconnection of the blades of a damper having an opposed blade action and the opening and closing thereof;

Fig. 16 is a schematic view similar to Fig. 15 and showing a larger number of blades;

Fig. 17 is an end view of an illustrative relief damper constructed in accordance with the invention;

Fig. 18 is a cross-section taken on the line 18—18 of Fig. 17;

Fig. 19 is an exploded view on an enlarged scale showing the connecting rod securing member which is positioned at the free end of the lever arm forming part of the blade securing element of the invention;

Fig. 20 is a partial end view illustrating a modified blade structure enabling the trailing edge of the blade to move through a minimum arc; and Fig. 21 is a cross-section taken on the line 21—21 of Fig. 20.

Referring more particularly to the drawings, the invention is described in connection with various specific air guide combinations with which it can be associated. In Figs. 1–10, the invention is illustrated both generically with respect to the new and simplified swivel mount which is achieved and also with respect to the combination of swivel mount and supporting strip, and the utilization of this combination in new, simplified and easily assembled diverter structures.

Referring to Fig. 1, there is shown an elongated strip 10 (preferably constituted by sheet metal) having parallel longitudinal edges 11 and 12. A plurality of openings 13 are formed in the strip 10, the openings 13 being spaced apart in longitudinal alignment along the length of the strip and preferably spaced an equal distance apart along a line coincident with the longitudinal centerline of the strip.

Cup-shaped securing elements 14 are mounted within the openings 13 for rotational or swivel movement in the plane of the strip 10. All of the cup-shaped securing elements are mounted to project through the strip 10 in the same direction.

A preferred form of cup-shaped securing element identified generically by numeral 14 is shown in Figs. 2 and 3. In this form, a cup-shaped portion 15 depends from the center of a generally circular, outwardly extending flange 16. The flange 16 is larger in diameter than the openings 13 and prevents the cup-shaped securing element 14 from being forced entirely through these openings. The cup-shaped portion 15 is formed with a slot 17 which extends substantially entirely across the meridian of the cup-shaped portion 15 to divide the cup-shaped portion 15 into substantially equal facing side portions 18 and 19. As can be seen, the slot 17 is defined between the side portions 18 and 19 and lies in a plane substantially at a right angle to the plane of the flange 16.

In the preferred construction of Figs. 2 and 3, the central section of the cup-shaped portion 15 is slightly larger than the diameter of the openings 13 in the strip 10. Because of the slot 17, the side portions 18 and 19 will flex when the cup-shaped portion 15 is forced through the openings 13 and the securing element 14, therefore, can be snapped into place.

The portion of the cup-shaped portion 15 adjacent the flange 16 is formed with a circumferential recess 20 which is slightly smaller than the diameter of the openings 13. Therefore, when the cup-shaped securing elements 14 are snapped into position, as shown in Fig. 4, these securing elements are more or less permanently mounted in the strip 10 and are rotatable in the plane of the strip 10 within the openings 13 thereof.

In accordance with the invention, a blade 21, which may be curved or straight, is positioned in a plane substantially at a right angle to the strip 10 and a marginal edge portion 22 thereof is positioned to project through the slot 17. The portion of the lateral margin 22 of the blade 21 which projects into the hollow interior of the cup-shaped portion 15 is deformed and this locks the blade 21 to the securing element 14 and, on a rotatable basis, to the strip 10 via flange 16.

The resulting structure is shown in the partial perspective view of Figs. 5 where it can be seen that the securing element 14 is now, in fact, permanently secured to the strip 10 because of the presence of the flange 16 on one side of the strip 10 and the blade 21 on the other side thereof. However, rotation of the securing element 14 has not been prevented and the blades 21 may be moved or made to swivel with the securing element 14. This rotational or swivel movement is about an axis perpendicular to the plane of the strip 10 passing through the center of the openings 13. As will be seen in Fig. 4, the distance between the termination of slot 17 and the flange 16 is greater than the thickness of the strip 10 so that the blade 21 is free to swivel.

Fig. 6 pictorially illustrates the combination of strip and longitudinally spaced securing elements in coil form. In this form, it is a simple matter to withdraw and sever from the coil a desired length of strip 10 with securing elements 14 pre-mounted therein and accordingly available for immediate use, as for example in the diverter structure shown in Figs. 7–10.

Referring more particularly to Fig. 7, the numeral 30 identifies a main duct through which air is moving as indicated by arrows 31. Branching away from the main duct 30 is an extension duct 32 which may terminate abruptly in a register or which may run for a considerable distance and lead to several registers or further branches of a ductwork system.

Positioned in the duct 32 at its leading intersection with the duct 31 are supports 33 to which a pair of strips 10 are pivotally mounted with the pivot points 33' being at approximately a 45° angle to the longitudinal axis of the duct 31.

In the preferred construction illustrated, supports 33 are positioned at the top and bottom of the duct 32 and each support 33 pivotally carries a pair of strips 10. These strips 10 are identical with the strip 10 of Fig. 1 and have securing elements 14 mounted in longitudinally spaced apart position along the length of the strip as is illustrated in Fig. 6.

As can be best seen in Fig. 8, the lateral edges of the diverter blades 34 are swivel mounted in the manner shown in Fig. 5 to each of the upper and lower strips 10. Part of the blades 34 are broken away in Fig. 8 to more fully show the support 33.

The open position of the diverter is shown in full lines in Fig. 7 and the closed position is shown in phantom. The diverter may be pivoted into any intermediate position as indicated by arc 35 so that a progressively smaller proportion of air is diverted from the main duct 31 smoothly into the extension or branch 32. Finally, in the closed position shown in phantom, substantially none of the air is removed or diverted from duct 30 into duct 32.

It will be observed that the blades 34 remain in non-rotational position, that is, the blades in translation remain always parallel to their parallel initial final position despite pivoting of the strips 10 along the arc 35. The swivel mounting of blades 34 to the strips 10 is essential to this action. The number 36 generically identifies a hand-operated mechanism secured to one of the strips 10 for manually moving the diverter into desired angular position. This structure is conventional and will not be further described.

The strips 10 may be pivotally secured to the support 33 in any desired manner. Securement may be achieved utilizing the securing elements 14 as is illustrated in Fig. 9 in which the cup-shaped portion 15 extends through openings 37 in the support 33 and are secured to a metal strip 38. The securement is loose to permit the easy pivotal movement of the strips 10.

Fig. 10 illustrates a modification of the diverter shown in Figs. 7 and 8. In this modification, a single strip 10 is secured to the blades 34. The securing elements 14' in Fig. 10 differ from the securing elements 14 shown in Figs. 2, 3, 4 and in Figs. 7-9 in that the outwardly extending flange 16' is extended to constitute a lever arm 39 which extends in the same approximate direction as the direction of the slot 17. The free ends of the lever arms 39 are connected together by a rigid connecting rod 40 which is pivotally secured as indicated at 41 to the lever arms 39 in a manner which will be more fully described hereinafter (see Figs. 18 and 19). The inner end of the connecting rod 40 is pivotally secured in any suitable manner at 42. The connecting rod 40 is preferably parallel with the strip 10, this parallel position being dictated by the identical configurations of each of the securing elements 14'.

Various modifications in the diverter structure may be made. Thus, a single strip 10 may be used to secure one end of the blades 34 and two parallel strips 10 may be used at the other end. Also, the parallel bar blade pivoting action illustrated in either Figs. 9 and 10 may be used at one or both ends of the blades 34. The important feature is that the diverter structure of the invention permits rapid assembly by the sheet metal worker including rapid final securement of an unsecured pre-assembly in which the blades 34 can be adjusted to insure the proper positioning thereof to permit proper opening and closing actions.

Also, by selection of blade curvature, length and positioning, the air flowing in duct 30 can be diverted at any desired angle. A right angle turn is illustrated although other angles may be encountered in commercial duct systems. Single blades 34 are illustrated but double blades are obviously applicable by having the blade 34 carry an inner blade of lesser curvature as is well known in the art. Also, the securing elements 14 or 14' may be secured to either the inner or outer blades of the double blade composite.

The resulting air turning devices are highly efficient in operation because the deformation of the blades which locks these blades instantly in their final desired position is not performed until all of the blades are in proper alignment with the strips and in final properly fitted position. This is a very substantial improvement over existing practice where the difficulty of precisely predetermining every swivel joint has substantially removed the construction of air turning devices of the general type here under consideration from the sheet metal contractor and turned the responsibility of producing these devices to mass production equipment capable of producing parts to close tolerances. As a result, the expense of these devices has been excessive and their utility substantially reduced. As a matter of practice, the pre-constructed air turning unit rarely fits the job at hand and the delay and expense of ordering and obtaining a custom job which does satisfy the needs of the moment has led to widespread dissatisfaction with present methods. This dissatisfaction is of long standing, but the present invention is the first successful solution to the problems of providing such a highly simplified air turning device construction that it is economical and advantageous for the individual sheet metal contractor to construct his own units as a general practice.

An illustrative multiblade damper constructed in accordance with the invention is illustrated in Figs. 11, 12, 13 and 14. The multiblade damper is generically identified by the numeral 50. The damper 50 includes a damper frame 51 which is intended to be mounted within a duct. The frame 51 comprises side plates 52 and 53, and upper and lower connecting members 54 and 55 respectively. The side plates 52 and 53 are formed with side flanges 56 and the upper and lower connecting members 54 and 55 are formed with side flanges 57, the side flanges referred to above being secured to one another in any suitable manner as by welding which is indicated by the numeral 58.

The damper illustrated is of the opposed-blade action type and includes damper blades 59 which extend across the frame 51 between the side plates 52 and 53. In the damper illustrated, these blades 59 are individually mounted for rotational or swivel movement and are interconnected so that they will move in unison.

The swivel mounting which is desired is achieved in the manner previously described in Fig. 5 and is specifically illustrated in the partial perspective view shown in Fig. 14. Each of the side plates 52 and 53 are formed with openings 60 which are equally spaced along the length of the side plates with the openings 60 in each of the side plates being laterally juxtaposed with respect to one another.

In a preferred commercial embodiment, bushings 61 provided with circular flanges 62 are inserted within the opening 60 in the side plates to provide an improved bearing support for the cup-shaped securing elements.

Referring to Fig. 11, it will be seen that the blades 59 are shaped in conventional manner to overlap when closed and that the central portion of the blades is flat as indicated at 63 so that the blades will fit within the slots of the cup-shaped securing elements which serve to rotatably mount the blades.

In assembling the damper of Figs. 11-14, the frame 51 is first completed and the bushings 61 are inserted in the openings 60. The blades 59 are then roughly positioned between the bushings 61 and cup-shaped securing elements 64 and 64' are inserted through the bushings 61 with the lateral extremities of the flat central portion 63 of the blades 59 being received within the slots 65 of the securing elements 64 and 64'. The assembly procedure is more fully set forth and claimed in my co-pending application, Serial No. 713,895, filed of even date herewith.

It will be observed that two types of securing elements are employed, one to receive an actuating mechanism such as the hexagonal bolt 66 which serves as a key and which may support a handle 67 or which may be connected to a suitable motor, etc. The other type of securing element identified by numeral 64' is provided with integral lever arms 68 which function to transmit the turning movement of one of the blades 59 to the other blades so that all of the blades 59 will move in unison.

After the blades 59 have been properly positioned and all of the securing elements 64 and 64' inserted, and the damper has been tested, as by closing all of the blades, minor adjustment of blade position may be made at this time to insure proper blade rotation and inter-engagement. The portions of the blades 59 which project into the interior of the cup-shaped portion of the securing elements 64 and 64' are then secured, preferably by slitting and deforming the projecting portion of blade 59 against the interior of the cup-shaped portion as illustrated in Fig. 14. Connecting rods 69 are then fastened in place by pins 70 and the damper is complete.

The securing elements 64 and 64' are formed with inwardly tapering portions 66' adjacent the bottom thereof and the portion of the blade 59 which projects into the cup-shaped portion of the securing element is slit along a pair of spaced apart parallel lines as illustrated in Fig. 14 with the portion of the blade 59 adjacent the slit being deformed against the interior of the cup-shaped portion and specifically against the interior of the inwardly tapered portion 66' adjacent the bottom of the cup-shaped portion.

The securing element 64 is shaped to provide a hexagonal interior cross-section for engagement with the hexagonal bolt 66. As will be evident the bolt 66 serves as a key and may have any non-circular cross-section in which event, the interior of the securing element 64 may be similarly shaped. Connection with the exterior of the securing element 64 is also feasible.

It will be particularly observed that the securing elements 64 do not have an outwardly extending flange at the rear thereof. Since the side plates 52 and 53 are prevented from moving apart by the upper and lower connecting members 54 and 55 and since the blades 59 substantially fill the space between the bushings 61, a flange is unnecessary.

While a multiblade damper of opposed blade action has been illustrated, it will be appreciated that the invention is also applicable to single blade dampers as well as multiblade dampers of parallel action and multiblade dampers in which some of the blades are linked together for parallel blade action while other of the blades are linked together for opposed blade action to provide a damper of the "by-pass" type.

In Fig. 11, the connecting rods 69 cross to provide opposed blade action. When the connecting rods 69 do not cross, but instead run down one side or the other, or both, a parallel blade action is obtained.

The opposed blade action provided by the illustrative damper in Fig. 11 is not perfect in that it is desirable that all of the blades 59 close completely and overlap one another in closed position to completely shut off the flow of air through the duct. The difficulty in achieving this as well as the solution to the problem proposed by the present invention is illustrated in Figs. 15 and 16.

Referring more particularly to Fig. 15, it will be seen that the blades 59 are each provided with folded upper and lower portions 70 which overlap, as illustrated in the center of Fig. 15. In this figure, the closed position of the blades 59 is illustrated in full lines and the open position is illustrated in dotted lines. The blades 59 travel through arcs 71 and 72 to move between the closed and open positions. The lower blade in Fig. 15 will be referred to as the overlapping blade since the upper folded portion thereof overlaps the lower folded portion of the upper blade with respect to the direction of travel of both of these blades during the opening movement. In the same manner, the lower folded portion of the upper blade underlaps the upper folded portion of the lower blade so that the upper blade 59 will be referred to as the underlapping blade.

It will be seen that the upper blade which is the underlapping blade moves through the arc 71 while the lower blade which is the overlapping blade moves through the arc 72 and that these arcs 71 and 72 intersect as indicated at 73. As a result of the intersecting action of the overlapping and underlapping blades, there is a danger that the adjacent blades 59 in the damper illustrated in Fig. 11 will jamb upon closing or that the overlapping blade will close first to prevent the desired seal between the blades in the closed position. It will be observed in Fig. 15 that the lever arm 68 which is connected to the axis of rotation of the underlapping blade 59 is positioned, when the blades are closed, at an angle in excess of 45° from the vertical as indicated by the angle θ. It will also be observed that the angle between the overlapping blade 59 and the lever arm 68' connected to the axis of rotation thereof is less than 45° as indicated by the angle φ. The angle θ is preferably more than 55° and the angle φ is preferably less than 20°. The best results are secured when the angle θ is 60° and the angle φ is 15°. The difference between the respective angles is from 15 to 75°, preferably about 45°.

The lever arm angles discussed above cause the overlapping blade to open more rapidly at the beginning of the opening action in advance of the underlapping blade. At the same time, when the blades are closing, the underlapping blade closes first and the overlapping blade closes rapidly behind the underlapping blade. As a result and despite the intersection of arcs 71 and 72 as indicated at 73, the blades 59 do not interfere with one another.

The action of the blades is pictorially illustrated in Fig. 15 with an intermediate position being illustrated in phantom. As will be seen, a given movement of lever arm 68' produces a smaller movement in lever arm 68, so that at the beginning of the opening action, the overlapping blade 59 moves a large distance whereas the underlapping blade 59 moves a small distance. The large distance is indicated by the letter $a$ and the small distance is indicated by the letter $b$.

Fig. 16 illustrates the operating mechanism for a four-blade damper having blades 59, 59', 59", and 59'''. It will be seen that the lower end of blade 59 underlaps the upper end of blade 59' in the direction of travel as indicated by the intersecting arcs 71 and 72. It will further be seen that the lower end of blade 59' overlaps the upper end of blade 59" in the opposite direction which, in reality, is the same direction for it is again measured with respect to the direction of movement which is now in the opposite direction as indicated by the intersecting arcs 74 and 75. As a result, alternating blades of an opposed blade action damper are overlapping blades while the remaining blades are underlapping blades.

The lever arms 68 connected to the underlapping blades and the lever arms 68' connected to the overlapping blades are connected together by connecting rods 76 which cross from one side of the blades to the other side of the blades, as is illustrated, to provide an opposite rotation for the overlapping blades with respect to the underlapping blades. If desired, and particularly when a large number of blades are employed in a given damper unit, a reinforcing connecting rod 77 may be used.

In Figs. 17–19, there is illustrated a relief damper constructed in accordance with the invention, it being understood that various modifications may be made, some of which are illustrated in Figs. 20 and 21.

Referring more particularly to Fig. 17, there is illustrated a closed frame comprising side members 80 having side flanges 81 which are connected by upper and lower connecting members 82 having side flanges 83. The side flanges 81 and 83 are secured where they intersect as by welding (not shown).

The side plate 80 is formed with a plurality of longitudinally spaced apart openings 84 through which blade securing elements 85 are inserted. These blade securing elements 85 are similar to those shown in Fig. 10 with the exception that the integral lever arms 86 project at an angle from the direction of the slot 87 instead of being generally parallel with the direction of the slot as is shown in Fig. 10. It will be appreciated that the opposite side plate 80 which cannot be seen in Fig. 17 is similarly formed with a plurality of openings 84 which are laterally juxtaposed with the openings 84 of the side plate 80 which can be seen in Fig. 17.

Mounted between the laterally juxtaposed openings 84 are a plurality of damper blades 88, the upper and lower edges of which are folded as indicated at 89 to overlap when the blades 88 are closed and thereby provide an effective seal against the movement of air through the relief damper as indicated by the arrow. The closed blade position is illustrated in Fig. 17, the blades 88 being intended to open by rotation thereof in the direction indicated by arrow 90. It will be observed that the upper folded portion 89 moves in an opposite direction as indicated by arrow 91, the significance of which will be more apparent hereinafter.

The end of the lever arms 86 remote from the point of securement between the connecting rod securing elements 85 and the blades 88 is provided with a pivotal or swivel securing member 92, and a connecting rod 93 extends along the line of connecting rod securing members 92 and is fastened to each of these by set screw 94 so that when one of the blades 88 is opened by the passage of air through the relief damper, all of the blades 88 will move, e.g., open in unison. In this manner, the flow of air through the relief damper is maintained uniform and a rattle-free unit is provided since individual blades are not free to move independently of other of the blades.

Referring to Fig. 18, the blade mounting can be seen in greater detail. It will be particularly observed that the blade securing element 85 comprises a cup-shaped portion 95 which is slotted across the meridian thereof as indicated at 87. As will be seen, a portion of the lateral margin of the blade 88 projects through the slot 87 into the interior of the cup-shaped portion 95 as indicated at 96. The projecting portion 96 is secured within the interior of the cup-shaped portion 95 in the manner previously described.

The manner of mounting the connecting rod securing member identified by numeral 97 is shown in Fig. 18 and the description which follows has reference also to Fig. 19 where the construction of the connecting rod securing member 97 is shown in greater detail. The connecting rod securing member comprises a cylindrical body 98, an outwardly extending flange 99 at one end thereof, a circular recess 100 adjacent the flange 99, a connecting rod receiving bore 101 and a threaded opening 102 adapted to receive set screw 94. Since the threaded bore 102 communicates with the connecting rod receiving bore 101, tightening of the set screw 94 will clamp the connecting rod 93 to the connecting rod securing member 97. As can be seen in Fig. 18, connecting rod securing member 97 is mounted for swivel movement in a circular opening 103 in the free end of the lever arm 86. This free end of the lever arm 86 is offset as indicated at 104 to provide clearance for the flange 99. The connecting rod securing member is pre-assembled with the blade securing element 85 and retained in the opening 103 by a split washer 105 which is inserted in the circular recess 100 after the connecting rod securing member 97 has been inserted in the opening 103.

Referring to Figs. 20 and 21, the end of the lower blade 38' adjacent the blade securing element 85 is folded over upon itself so as to form a seal with the folded lower end of the upper adjacent blade 88'. By folding in the manner illustrated in Fig. 20, pivoting of the blades 88' will cause the upper ends of these blades which are secured to the blade securing elements 85 to traverse a path 91' of minimum diameter. As can be seen, the portion of the blade 88' forming the portion of the base of a triangle defined by the portion of the blade which is folded over upon itself constitutes the portion of the blade 88' which is inserted in the slot 87.

In the form of relief damper illustrated in Fig. 20, a baffle is provided to limit flow of air in the clearance space provided between the lateral edges of the blades 88' and the interior surface of the side plate 80. This baffle can be seen with particular clarity in Fig. 21 where the baffle is identified by the numeral 106. It will be appreciated that the baffle 106 may be integral with the side plate 80 or it may be constituted by a separate piece suitably secured to the interior of the side blade 80, as for example in the manner shown in Fig. 20 and Fig. 21.

Many variations in air guide structure may be made as will be evident to those skilled in the art, the invention being defined in the claims which follow:

I claim:

1. A securing element adapted for the swivel mounting of a first sheet member with respect to a second sheet member positioned in a plane perpendicular to said first sheet member comprising a cup-shaped securing element comprising a cup-shaped portion having a slot extending across the meridian thereof and a lever arm projecting laterally of said cup-shaped portion at the rear thereof, and a connecting rod securing member pivotally secured to the free end of said lever arm.

2. A securing element as recited in claim 1 in which said connecting rod securing member is a cylindrical body having a bore extending transversely therethrough and set-screw means communicating with said bore.

3. A securing element adapted for the swivel mounting of a first sheet member with respect to a second sheet member positioned in a plane perpendicular to said first sheet member comprising a cup-shaped securing element comprising a cup-shaped portion having a slot extending across the meridian thereof and a lever arm projecting laterally of said cup-shaped portion at the rear thereof, at the end the said lever arm projecting away from said cup-shaped portion at an angle of about 15° with respect to the direction of said slot.

4. A securing element adapted for the swivel mounting of a first sheet member with respect to a second sheet member positioned in a plane perpendicular to said first sheet member comprising a cup-shaped securing element comprising a cup-shaped portion having a slot extending across the meridian thereof and a lever arm projecting laterally of said cup-shaped portion at the rear thereof, the lever arm projecting away from said cup-shaped portion at an angle of about 60° with respect to the direction of said slot.

References Cited in the file of this patent

UNITED STATES PATENTS

| Number | Name | Date |
| --- | --- | --- |
| 425,542 | Hantsche | Apr. 15, 1890 |
| 688,400 | Belding et al. | Feb. 19, 1901 |
| 1,675,788 | Carr | July 3, 1928 |
| 1,675,792 | Carr | July 3, 1928 |
| 1,963,814 | Walters | June 19, 1934 |
| 2,007,716 | Green | July 9, 1935 |
| 2,051,613 | Macleod | Aug. 18, 1936 |
| 2,715,250 | Bedford | Aug. 16, 1955 |